United States Patent [19]
Hintringer

[11] 3,781,709
[45] Dec. 25, 1973

[54] LASER ARRANGEMENT
[75] Inventor: Otmar Hintringer, Neubiberg, Germany
[73] Assignee: Siemens Aktiengesellschaft, Berlin and Munich, Germany
[22] Filed: Aug. 2, 1972
[21] Appl. No.: 277,161

Related U.S. Application Data
[63] Continuation of Ser. No. 68,179, Aug. 31, 1970, abandoned.

[52] U.S. Cl. .............................................. 331/94.5
[51] Int. Cl. .............................................. H01s 3/02
[58] Field of Search .................................. 331/94.5

[56] References Cited
UNITED STATES PATENTS
3,400,596  9/1968  Laich .................................. 331/94.5
3,553,604  1/1971  Andress et al. ..................... 331/94.5
3,581,231  5/1971  Freiberg ............................. 331/94.5

Primary Examiner—William L. Sikes
Attorney—Hill et al.

[57] ABSTRACT

A laser arrangement, and particularly a gas laser, has resonator means contained in a housing or enclosure and mounted therein by yieldable, vibration-dampening means in a manner to mechanically isolate the resonator with respect to the housing so that shifting or expansion of the housing during a warm-up period will not disturb or effect the dimensioning or spacing of reflectors forming a portion of the resonator means. Also, any misalignment of a gas laser tube relative to the resonator reflectors due to thermal expansion or otherwise is avoided by mounting the tube directly in the resonator and by not connecting the tube to the housing.

5 Claims, 1 Drawing Figure

PATENTED DEC 25 1973 3,781,709
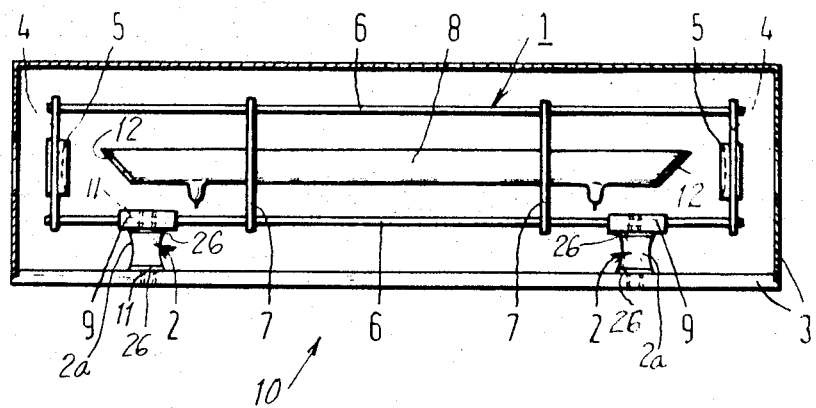
INVENTOR
Otmar Hintringer
BY Hill, Sherman, Meroni, Gross v Simpson ATTYS.

LASER ARRANGEMENT

This is a continuation of application Ser. No. 68,179, filed Aug. 31, 1970 and now abandoned.

BACKGROUND OF THE INVENTION

1. Field of the Invention

This invention generally relates to a laser arrangement, and more particularly refers to gas lasers of the type including a pair of reflectors forming resonator means contained in a housing and having the laser active medium or gas laser tube disposed therebetween.

2. Description of the Prior Art

One type of gas laser includes a laser active medium, such as a gas laser tube disposed between a pair of opposed reflectors forming a resonator. In order to prevent contact with electrically charged parts and to avoid damage to the laser tube, the resonator and laser tube are enclosed within a housing or other suitable enclosure. Since the enclosure or housing and the resonator structure thermally expand at different rates during a warm-up period or operation, the resonator can not be rigidly connected to the housing. In the event the resonator was directly or rigidly connected to the housing, the reflectors would be displaced from their optimum spacing or dimensioning and detuned, thereby causing large fluctuations and the possible extinguishment of the laser-output radiation.

Heretofore, in order to avoid such undesirable displacement of the reflectors, various complex structures and systems have been proposed. One such prior proposal includes providing a three-point mounting above a cone, a prism and a plane with the mounting of those three points, respectively, having different degrees of freedom so that the resonator structure is mechanically isolated with respect to the housing. Another approach has been to provide crowned, Cardanic-type suspension members or supports.

Those prior art structures have proved to be very costly and technically time consuming since they must be produced and inserted with extreme care to prevent canting of the reflectors.

SUMMARY OF THE INVENTION

In accordance with the present invention, resonator means for a laser arrangement are mounted within a suitable housing and connected thereto by supports which contain elastic, vibration-dampening portions. The yieldable or elastic portions preferably consist of rubber.

It has been found desirable to use vibration-dampening connectors of the type normally utilized for avoiding the transmission of motor vibrations in washing machines or similar devices. One form of such vibration-dampening connectors include a rubber core having rigid plates affixed at opposite end portions of the core.

Thus, applicant has recognized that the high technical cost heretofore required for prior resonator mounts is not necessary for the construction of a safe-functioning laser arrangement.

Also, in accordance with the present invention, the laser active medium or element such as a gas laser tube is mounted within the resonator means for adjustable movement therewithin and is not coupled to the housing or other enclosure surrounding the resonator. With that arrangement, the axial position of the laser active medium or laser tube does not shift with respect to the axis of the resonator arrangement, due to temperature fluctuations. Such shifting of the laser-active medium would result in displacement of the medium from the tuned position, thereby resulting in fluctuations of the output efficiency of the laser.

Accordingly, it is a primary object of the present invention to provide simple and inexpensive means for mounting a resonator of a laser arrangement within a housing enclosing the resonator and a laser-active medium.

Another object of the present invention is to provide resonator mounting means which comprise vibration-dampening connectors of the type including an elastic, yieldable portion.

A further object of the present invention is to provide a laser arrangement wherein the resonator is mounted within a housing or other enclosure in a manner to be mechanically isolated therefrom and a laser-active medium or gas laser tube is mounted within the resonator and not directly connected to the housing.

BRIEF DESCRIPTION OF THE DRAWING

Other objects, features and advantages of the present invention will be readily apparent from the following description of a preferred embodiment thereof, taken in conjunction with the accompanying drawing, although variations and modifications may be effected without departing from the spirit and scope of the novel concepts of the disclosure, and in which a laser arrangement embodying the features of the present invention is diagrammatically illustrated.

DETAILED DESCRIPTION OF THE PREFERRED EMBODIMENTS

Referring to the drawing, a gas laser 10 includes a resonator structure 1 enclosed within a housing or other suitable enclosure 3. The resonator 1 is mechanically supported within, and isolated from, the housing 3 by a plurality of mounts or connectors 2.

In accordance with the present invention, each of the mounts or connectors 2 includes a yieldable or elastic core 2a and a pair of rigid plates 2b, 2b affixed to opposite ends of the core. Preferably, the resonator 1 is supported on three of the mounts 2 (in the drawing, one of the mounts is concealed behind other structure).

The resonator structure 1 includes a plurality of elongated rods 6 forming an open cage work and joined at their opposite end portions by a pair of spaced-apart plates 4, 4. Preferably, the resonator structure 1 includes three of the rods 6 arranged in a triangular configuration. Each of the end plates 4 has a central recess or aperture receiving one of a pair of opposed, spaced-apart reflectors 5, 5, which may be concave mirrors, as illustrated in the drawing. The reflectors or mirrors 5, 5 are disposed at a desired axial spacing in a manner to form a tuned resonator for the laser arrangement 10.

A plurality of support or connecting members 9 are attached to the resonator rods 6 and form connecting points for the mounts 2. The connectors 2 are attached to a wall portion of the housing 3 by means of set screws or headless screws as at 11 and also connected to the supports 9 by such screws. The support 9 is affixed to the resonator rod 6 as rigidly as desired. If desired, the connectors 2 may be directly attached at their innermost end, to the end plates 4, 4 or to a second pair of spaced-apart plates 7, 7 disposed inwardly of the end plates.

In accordance with the present invention, a laser active medium or element such as a gas laser tube 8 is mounted within the resonator structure 1 and axially aligned with the resonator reflectors 5, 5. As illustrated in the drawing, the laser-active medium may include a gas laser tube filled with a suitable gas or gas mixture and closed at opposite end portions by Brewster plates 12, 12. The gas laser tube 8 is supported within appropriate apertures formed in the second set or pair of plates 7, 7 in a manner to be axially adjustable within the resonator, thereby facilitating tuning of the laser arrangement 10.

From the foregoing description, it should be noted that the resonator structure 1 is mechanically isolated with respect to the housing 3 to prevent different thermal expansions of the housing and the resonator elements from resulting in displacement or skewing of the resonator reflectors 5, 5 during the warm-up period. Also, the gas laser tube 8 is mounted within and supported solely by the resonator so that thermal expansion of the housing will not distort nor displace the tube relative to the reflectors.

Although those versed in the art might suggest various minor modifications, it should be understood that I wish to embody within the scope of the patent warranted hereon all such modifications as reasonably and properly come within the scope of my contribution to the art.

I claim as my invention:

1. A laser arrangement comprising a pair of optical reflector means, a structure for positioning said pair of optical reflector means in a predetermined position to form an optical resonator, said structure supporting a laser active element between said pair of optical reflector means, a housing means receiving said structure, and vibration dampening connector means for supporting said structure in the housing means, said connector means having a yieldable member for mechanically isolating said structure from said housing means so that the yieldable member prevents the transmission to said structure of vibrations which are applied to the housing means and prevents the application to said structure of stresses which are created in the housing means due to thermal expansion and contraction.

2. A laser arrangement according to claim 1 wherein the laser active element is a gas laser tube, and wherein said structure includes a plurality of substantially parallel rods forming an open cage work, said rods being held in their respective opposite ends by a pair of end plates, said gas laser tube being positioned in said cage work generally parallel to said rods, and said pair of optical reflector means of the optical resonator being supported by the pair of end plates in a plane perpendicular to the axis of said gas laser tube.

3. A laser arrangement according to claim 2 wherein said cage work includes a pair of tube mounting plates extending generally transversely between said rods and spaced between said pair of end plates, said gas laser tube passing through apertures formed in the mounting plates and being supported thereby.

4. A laser arrangement according to claim 1 wherein said connector means each include an elastic, resilient core forming said yieldable member and a pair of rigid plate members affixed at opposite ends of said core, said rigid plate members forming mounting portions for attachment of said connector means between said housing means and said structure.

5. A laser arrangement according to claim 4 wherein said elastic core consists essentially of a resilient rubber material.

* * * * *